United States Patent
Williams et al.

(10) Patent No.: US 10,282,555 B2
(45) Date of Patent: May 7, 2019

(54) VALIDATION AND AUTHENTICATION OF DIGITAL DOCUMENTS ISSUED BY AN ARCHITECT

(71) Applicant: HKS, Inc., Dallas, TX (US)

(72) Inventors: Craig Williams, Lucas, TX (US);
Timothy Logan, Dallas, TX (US);
Ryan Gathmann, Dallas, TX (US);
Heath May, Richardson, TX (US)

(73) Assignee: HKS, INC., Dallas, TX (US)

( * ) Notice: Subject to any disclaimer, the term of this patent is extended or adjusted under 35 U.S.C. 154(b) by 279 days.

(21) Appl. No.: 15/209,417

(22) Filed: Jul. 13, 2016

(65) Prior Publication Data

US 2018/0018468 A1 Jan. 18, 2018

(51) Int. Cl.
*G06F 21/60* (2013.01)
*G06F 16/93* (2019.01)
*G06F 21/64* (2013.01)

(52) U.S. Cl.
CPC ............ *G06F 21/602* (2013.01); *G06F 16/93* (2019.01); *G06F 21/64* (2013.01)

(58) Field of Classification Search
CPC ............. G06F 21/602; G06F 17/30011; G06F 17/30091
See application file for complete search history.

(56) References Cited

U.S. PATENT DOCUMENTS

| | | | |
|---|---|---|---|
| 6,918,082 B1 * | 7/2005 | Gross | G06F 17/2288 707/E17.008 |
| 7,024,562 B1 * | 4/2006 | Flink | H04L 9/3231 713/176 |
| 8,320,608 B2 | 11/2012 | Saito et al. | |
| 8,781,976 B1 | 7/2014 | Rakowicz et al. | |
| 8,924,307 B2 * | 12/2014 | Han | G06F 21/645 705/51 |
| 9,054,860 B1 * | 6/2015 | Rothschild | H04L 63/0876 |
| 10,055,392 B2 * | 8/2018 | Kraley | G06F 17/2288 |
| 2004/0064432 A1 * | 4/2004 | Oetringer | G06F 17/30011 |
| 2011/0078169 A1 * | 3/2011 | Sit | G06Q 10/10 707/769 |

* cited by examiner

*Primary Examiner* — Saleh Najjar
*Assistant Examiner* — Devin E Almeida
(74) *Attorney, Agent, or Firm* — Ross Barnes LLP; Monty L. Ross; Robin L. Barnes (57) ABSTRACT

A method and system for authenticating and validating electronic architectural documents. A document approved by a licensed architect has the architects digital seal and signature associated with or inserted into the document file. A hash function is performed to create an issued file with the digital seal and signature and a cryptographic hash. The issued document is distributed to a recipient, extracted to a local drive, and subsequently accessed for use in an architectural project. The cryptographic hash of the extracted file is compared to that of the accessed filed to determine if they are the same. If the same, the accessed document is validated and the digital seal and signature remain visible in the accessed document. If not, the accessed document is not validated and the digital seal and signature are removed from or hidden, indicating the document should not be used.

9 Claims, 7 Drawing Sheets

VALIDATION AND AUTHENTICATION OF DIGITAL DOCUMENTS ISSUED BY AN ARCHITECT

BACKGROUND OF THE INVENTION

1. Field of the Invention

This invention relates to the validation and authentication of architectural documents issued electronically in order to obtain permitting or for construction purposes to ensure that the documents are accurate and approved by a licensed architect.

2. Description of Related Art

Licensed architects create numerous documents in connection with an architectural design project, including drawings, models, databases, and informational documents. With respect to drawing documents, these used to be hand-drawn, but with the availability of drafting software they are typically done using computer software. Similarly, text documents and databases are typically created electronically. Each finalized electronic document is "issued" by the architect by being printed, the print-out stamped with the architect's seal and signed by the architect to authenticate the document as a final drawing or other document approved by the architect. The architect's seal is a rubber stamp (using ink) or an impression/embossing stamp that is used to mark paper documents. During the process, changes in project scope may arise that require revisions or modifications to the previously issued documents. New versions with the necessary changes are created, approved by the architect, and then printed and sealed/signed by the architect to issue the latest version of the documents. Each of the issued documents typically will include a revision number and date associated with the revision, to allow tracking of the documents so that the most up-to-date versions can be used. One or more sets of these issued documents, and any revisions thereto that are subsequently issued, are then submitted to various state agencies as part of the building permitting and review process and are provided to contractors and fabricators working on the construction aspects of the architecture project. In the event of any problems during the construction process, the most recently issued documents (e.g. the most recent versions of the printed and sealed/signed drawings) can be reviewed and compared to the actually constructed (or partially constructed) structure to determine whether or not the architect's plan as indicated on the authenticated issued documents has been followed.

Although the process of issuing documents in paper form that are sealed/signed by the architect is a good way of authenticating the documents as approved by the architect, there are several problems associated with the use of paper documents during this process. First, the process involves printing a substantial number of documents for submission to permitting agencies, contractors, and fabricators, many of which will subsequently be replaced with updated revisions that also have to be printed in multiple copies for distribution to those same agencies and persons. Second, since the documents are created electronically, electronic versions are frequently made available to contractors and fabricators, who ultimately rely on the electronic versions rather than the issued paper versions because the paper documents are voluminous and much more difficult to review at a construction site than electronic files that can easily be accessed on a tablet or laptop. However, there has not previously been any way to authenticate that the electronic versions are the documents that have been approved by the architect because they lack the architect's seal and signature. Because of authentication issues, permitting agencies have previously required submission of printed paper documents including the architect's seal and signature, rather than electronic documents, in order for permits to be issued. Additionally, the electronic versions are easily modifiable by recipients (other than the architect or users authorized by the architect) having access to them, resulting in changes that may be implemented during construction but have not been approved by the architect. In addition to unacceptable aesthetic modifications, such unapproved modifications may create serious structural problems and create safety issues.

Third, it is difficult to keep track of the most recent revisions of documents when paper documents are used. Generally, persons with access to the architect's electronic files can easily identify the most recent versions of documents and locate the associated printed and sealed/signed documents; however, contractors and fabricators usually will not have such access. Although the revised documents will be provided to them, it may be difficult to keep track of the most recent updates and ensure that they are incorporated into all of the printed document sets. If a contractor or fabricator is working from a set of printed documents that do not include the most recent updates, then the structure may be constructed in a manner inconsistent with the structure/design as currently approved by the architect. Even if the contractor or fabricator is provided with electronic versions of the documents and is able to keep track of the most recent versions, there is still the problem that the electronic files are not authenticated with the architect's seal and signature and can be modified by unauthorized persons.

Since these architectural documents are created electronically, it would be beneficial to be able to "issue" them electronically, including a digital seal and signature to indicate approval by the architect. It would also be beneficial to have an authentication system and method that allows electronic files transmitted to permitting agencies, contractors, and fabricators to be authenticated to ensure that they match the actual documents issued by the architect, thereby ensuring that the documents are genuine and have been approved by the architect, are the most recent versions and/or do not contain any modifications that have not been approved by the architect. There are known systems and methods for electronically sending and/or electronically signing documents and verifying the authenticity of the received document and/or electronic signature; however, these systems and methods have not been applied to architectural documents requiring an architect's seal and signature to be valid and obtain permits.

SUMMARY OF THE INVENTION

A method and system according to a preferred embodiment of the invention allows electronic architectural documents to be approved by a licensed architect by insertion or attachment of the architect's seal and signature in digital form to create an issued file containing data allowing for authentication comparison. Preferably that data is a cryptographic hash. The issued file is then distributed to authorized recipients for extraction to a local drive and subsequent opening for use in the review/permitting and/or construction/fabrication aspects of an architectural project. Upon opening or attempting to open the issued file, a software component of the system compares the cryptographic hash of the extracted file with that of the file being opened to determine if the hashes match. According to another preferred embodiment, the software component compares other file information or metadata, either in addition to or in lieu of the hash, of the extracted file with the file being opened to determine if the data matches and the digital seal and signature should remain or be removed (or hidden from view). If the comparison fails, then the files are not the same and the digital seal and signature are removed or hidden from view on the file being opened. If the comparison passes, then the files are the same as issued by the architect and the digital seal and signature remain visible on the document of the file being opened. The presence or absence of the digital seal and signature upon opening the document indicates whether or not it is a valid and authenticated document as issued by the architect, which may be used for the architecture project, or that the file has been altered in some way that has not been approved by the architect and should not be used with the architecture project.

According to one preferred embodiment, distribution of issued files comprises emailing the files to designated recipients and using a desktop or other locally stored/accessible software application for authentication. In another preferred embodiment, distribution of issued files comprises uploading them to an online file sharing site or saving them to a local database that is accessible by authorized recipients via the internet using a web-based (or cloud system) software application for authentication. According to another preferred embodiment, the method and system comprises document creation and revision components that allow documents to be created, reviewed by a licensed architect, and revised as needed to meet with the licensed architect's approval. A user may be prompted to take certain actions, such as sending a finalized version of a document to the licensed architect for review, or those actions may be options that the user can select at various stages of creation, review, and revision processes. According to another preferred embodiment, the method and system comprises project set-up and management components that allow documents created or revised as part of a project (or sub-project) to be associated with particular users, recipients, and/or storage locations to facilitate movement of files during the creation, revision, and project change stages of a project, facilitate sending notices to appropriate users or recipients, and facilitate locating document files when needed. According to another preferred embodiment, the method and system comprises access tracking components, that records information each time a recipient accesses documents for extraction or authentication, such as recipient identification, time, identification of particular file(s) selected, and/or whether the action taken is for extraction or authentication. Any of these components may be a desktop or local application or web-based application.

According to another preferred embodiment, the method and system comprises a project change component that tracks new revisions of documents made per a change in project scope to help ensure only the latest document revisions are available for use by a recipient. Upon issuance of a new revision, a software component compares files stored in a database or file sharing site to determine if a prior version of the same file already exists and, if so, corrective action is taken. According to one preferred embodiment, corrective action comprises automatically deleting the prior version of the file and saving or uploading the new version, so only the new version is available for extraction and/or opening by a recipient. According to another preferred embodiment, corrective action comprises leaving the prior file in the database or on the file sharing site (along with the newly saved or uploaded version), but removing or hiding from view the digital seal and signature on the prior version file. If a recipient accesses and opens the prior version from the database or file sharing site, the digital seal and signature will be missing indicating the file should not be used. Additionally, the file being opened should fail the hash comparison with a previously extracted file (the prior revision that was extracted while the digital seal was in place), which would also indicate the file is not validated and should not be used. According to another preferred embodiment, notice of a previous revision is sent to a designated user to allow the user to take the desired corrective action, such as manually deleting the old file.

BRIEF DESCRIPTION OF THE DRAWINGS

The method of the invention is further described and explained in relation to the following drawings wherein.

DESCRIPTION OF THE PREFERRED EMBODIMENTS

Many materials created in connection with an architectural project will require approval of a licensed architect, but some (such as interior design color schemes for example) would not. As used herein with the description of the method and system, the terms "document" or "documents," refers to any type of electronic document (such as drawings, models, databases, informational documents, interior design materials, etc.) associated with an architectural project, regardless of whether or not those documents require a licensed architect's approval. As used herein, the terms "document requiring a seal," "documents requiring approval," and similar variations refer to any document that does require a licensed architect's approval according to federal, state, or local law or regulations before they are to be submitted for any locally required plan review or permitting process and/or prior to use in constructing the project or fabricating structures to be used in the project. As used herein, the terms "documents not requiring a seal," "documents not requiring approval," and similar variations refer to any document associated with an architectural project that does not require a licensed architect's approval according to federal, state, or local law or regulations. Document not requiring a seal may optionally be processed through a method and system of the invention, particularly for tracking revisions to such documents. But those documents that do require such approval, particularly where paper documents have previously been used with an architect's seal stamped or embossed on the pages and an original signature of the architect, would preferably be processed through a method and system according to the invention. Also, as used herein, a "user" is the architect or a person or entity associated with the architect, including a document creator, a document reviser, and an architectural firm, who is authorized by the architect to be involved in the creation, revision, approval, issuance, and distribution of project documents or otherwise involved with the project as part of the architectural design process. As used herein, a "recipient" is a person or entity that receives issued documents for use in connection with the review, permitting, and/or construction of the project, including plan review personnel, building inspectors, builders, fabricators, etc.

Figure 1:
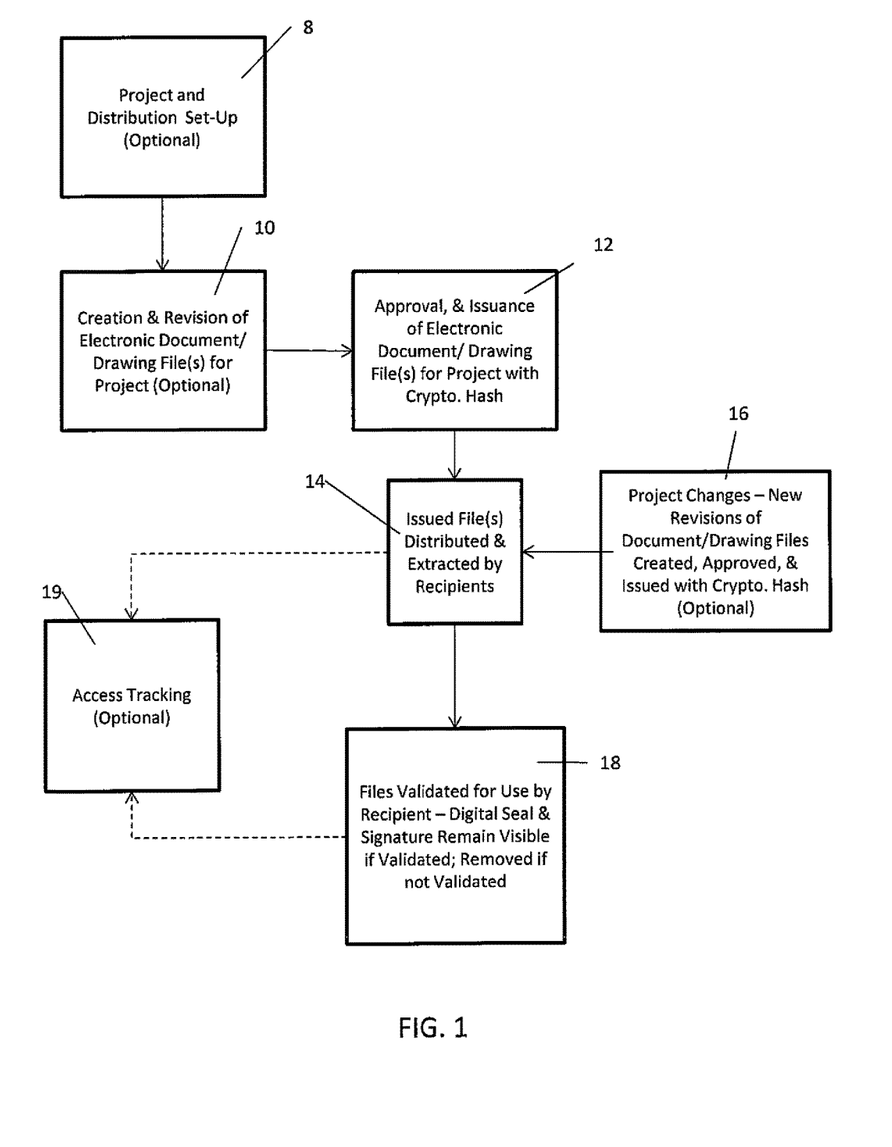
FIG. 1 is a flow chart showing process stages for a preferred embodiment of the validation method of the invention.

A preferred embodiment of a method for validating architectural documents as authentic documents issued by a licensed architect is shown in FIG. 1. The method includes several processing stages, including an optional creation and revision stage 10; and approval and issuance stage 12; a distribution and extraction stage 14; an optional creation, approval, and issuance stage 16 for revised documents per a change in project scope; a validation stage 18; an optional project and distribution set-up stage 8; and an optional access tracking stage 19. Preferred embodiments of processing stages 10, 12, and 14 are shown in more detail in FIG. 2. An optional creation and revision stage 10 preferably comprises a step 20 where electronic architectural documents are created in accordance with the scope of the particular project. The electronic documents are typically created using various word processing software and computer-aided design software, which are commercially available. The initial creation process may be performed by a licensed architect or unlicensed user working under the supervision of a licensed architect. The initial creation process may involve one or more revisions to a document before a final version is ready for review by the architect, if not created by a licensed architect. Once a final version of each document for a project is created, the file(s) are reviewed by a licensed architect at step 22. Most preferably, the creator is prompted as part of step 20 to indicate if a document being saved is a final version ready for review by the licensed architect. If the creator indicates yes, then the file will preferably be electronically sent to the licensed architect for review at step 22. The file may be emailed to the architect or may be stored in a project database and a notice may be sent to the architect that the file is in the database and ready for review. The particular architect who will review the document may be selected or entered by the creator at the final document saving step or he or she may have been pre-designated in the optional project set-up stage 8. The architect will open the file(s) being reviewed and determine if they are approved or rejected. When the architect is finished reviewing a file, the architect is preferably prompted upon saving or closing the file to electronically select whether the architect's review is complete or still ongoing. If ongoing, the file will be saved (if any changes have been made by the architect) or closed (if no changes made or the architect does not want to save the changes), so that it may be reopened for further review at a later time.

Figure 2:
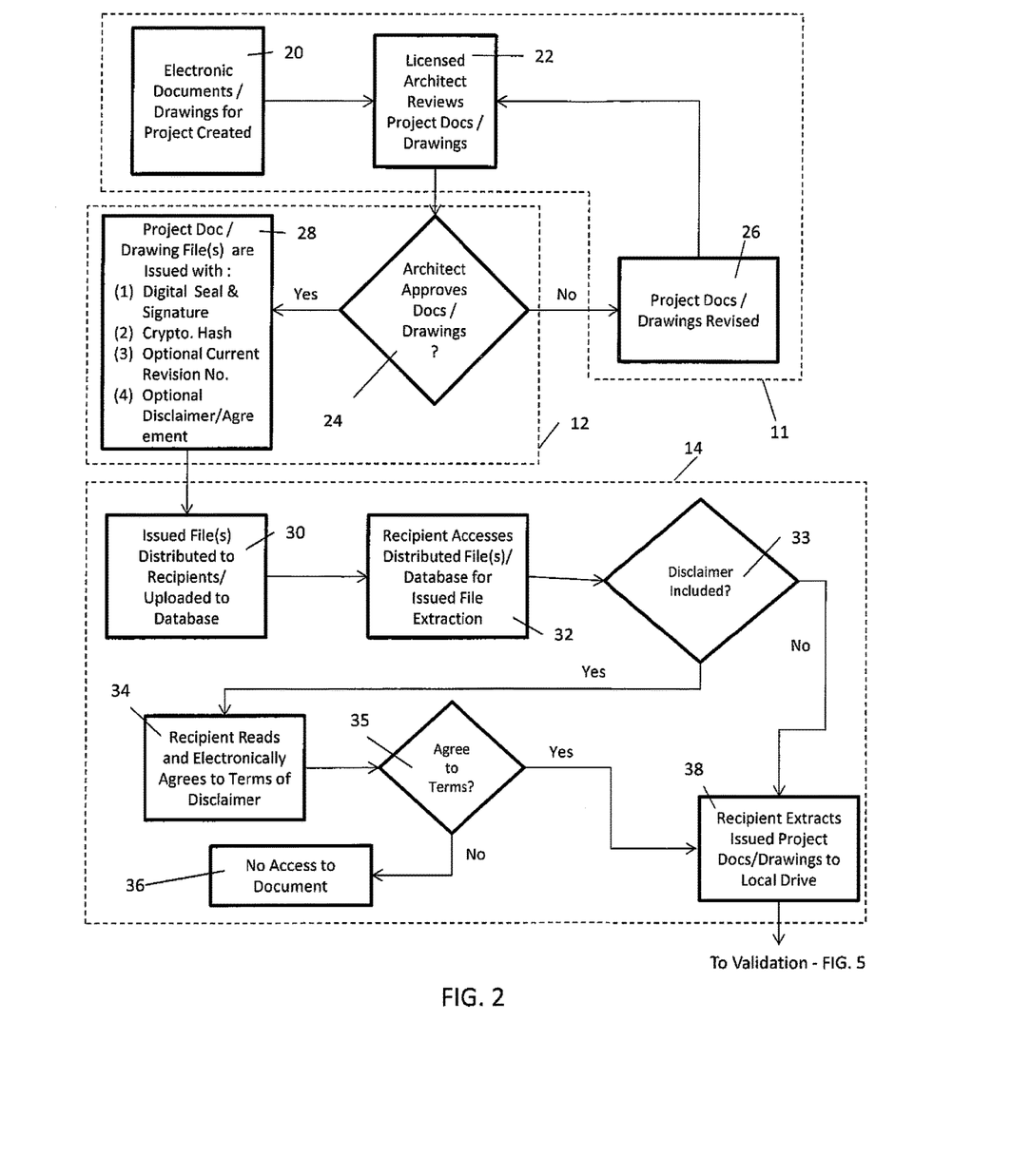
FIG. 2 is a flow chart showing preferred process steps for three stages of the embodiment according to FIG. 1.

An approval and issuance stage 12 comprises the architect's approval of documents and issuance as approved documents. If the architect's review is complete, the architect determines whether to approve or reject each document file created at step 24. Most preferably, the architect will be prompted to electronically approve or reject the file, which will automatically initiate further action for the document. If rejected, the documents are revised at step 26, which is part of the optional creation and revision stage 10. Most preferably, the file to be revised will be electronically sent to the creator or another designated user for revisions. The file may be emailed to the person to revise the document or it may be stored in a project database and a notice may be sent to the person to revise the document that the file is in the database and ready for revision. Such persons may be selected or entered by the architect at the rejection step or they may have been pre-designated in the optional project set-up stage 8. Preferably, if the architect rejects the file, the architect is given the option to provide notes or instructions for revisions. Such notes or instructions may be saved as a separate file that is sent with the file to be revised, it may be saved as a separate file that is electronically linked to the file to be revised, or the notes or instructions may be added to the original document file. The documents are revised as needed at step 26. When the file being revised is saved, the reviser is prompted as part of step 26 to indicate if the document being saved is a final version ready for review by the licensed architect. If the reviser indicates yes, then the file will be sent to the licensed architect for review at step 22, as previously described with respect to an original document. Again, if the architect is making the revision, the review at step 22 may be omitted.

Review step 22 may be omitted for any document created at step 20 or revised at step 26 by a licensed architect. Prior to saving any electronic document files, preferably as part of the creation process of step 20 or the revision process of step 26, the document creator/reviser may optionally be prompted to indicate whether he or she is a licensed architect. If yes, the method and system may bypass step 22 and prompt the architect to electronically select whether he or she has completed the creation or revision of the document or whether that step is still ongoing upon saving or closing the file. If ongoing, the file will be saved (if any changes have been made by the architect) or closed (if no changes made or the architect does not want to save the changes), so that it may be reopened for further revision at a later time. If the architect's creation or revision is complete, the architect will approve the document file at step 24 as previously described.

It is noted that creation and revision processing stage 10 is an optional part of a method and system according to the invention. The creation and document review and revision portions of the project process may be carried out separately from a method according to the invention, as they have previously been done, with approved documents being issued, distributed and validated according to preferred embodiments of the invention.

If approved, the documents are issued at step 28. Step 28 is described in more detail in FIG. 3. Step 28 preferably comprises the sub-steps of digitizing and storing the architect's seal and signature as an electronic file at step 40, inserting the digital seal and signature into the approved files at step 42, optionally inserting or including an electronic disclaimer or agreement regarding access, copying, and/or use of the approved file at step 44, running the approved file with the digital seal and signature and any optional disclaimer/agreement through a hash function at step 46 to create a cryptographic hash at step 48, after which the file is issued for distribution or uploaded to a database for distribution to recipients at step 50. The digital seal and signature are most preferably digitized by scanning a paper version of the seal and signature into an electronic file. Alternatively, the digital seal can also be an electronically created image, such as a raster or vector file. A digital signature can also be part of a public key infrastructure where a trusted Certificate Authority validates a signature, as is well understood by those of ordinary skill in the art. The digital seal and signature is then stored for future insertion into an approved file. Most preferably, the digital seal and signature are automatically added to all approved documents and positioned on those documents in space in which the seal would be stamped on a paper document, but other locations may also be used. After approving the file, the architect is preferably prompted to electronically indicate whether any disclaimer or agreement is to be linked with or attached to the file. One or more of such disclaimers or agreements may be pre-created and stored on components of a system according to the invention so that the architect may select which one, if any, to include. Alternatively, the architect may be given the option to paste in a prior disclaimer or agreement or type in a disclaimer or agreement. As another alternative, the architect may be given the option of sending the file to another person for review to determine if a disclaimer or agreement should be included. If yes, the file may be electronically sent to such person or a notice may be sent to such person to retrieve the file from a project database. A prompt upon opening the file will allow inclusion of a disclaimer or agreement in the same way as described above. As another alternative, a creator or reviser may be prompted as part of step 20 or 26 to automatically include (or not) a particular disclaimer or agreement into the file once approved for issuance at step 24.

Figure 3:
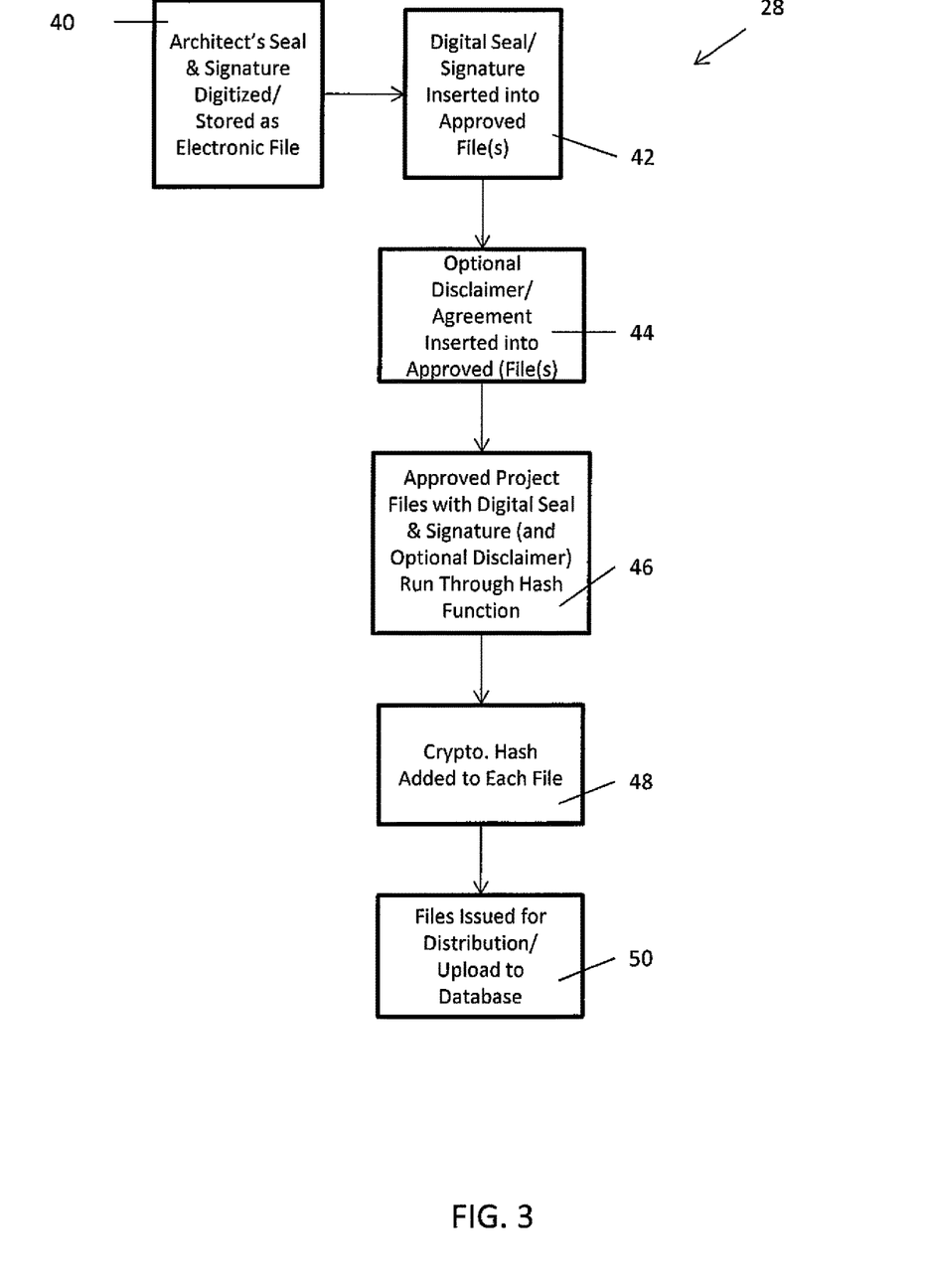
FIG. 3 is a flow chart showing details of one of the process steps of FIG. 2.

Typically, drawing software will automatically include certain information regarding a document, such as the name of the creator or reviser, the date originally created, the date last revised, and a revision number (e.g. 1, 1.1, 1.2, etc.). If not automatically included as part of the drawing software, a current revision number (which may be a number for an original document or a subsequently revised version of that document) for a document being issued may optionally be inserted into the document as text or as file metadata as part of the issuance step 28. Each time a document is modified by someone affiliated with the architect (the creator, a reviser, or the architect), a new revision number may be automatically inserted. Each time a file is revised, it is most preferably saved as a new file, with a name similar to the original or previous version (e.g. Front Elevation Rev. 1.0 would be the original file and Front Elevation Rev. 1.1 would be the revised file). This makes it easier to keep track of similar files and maintains an electronic copy of each version of the document, should a historical version ever be needed. It also allows for optional comparison of file versions or revisions as part of processing stage 16, discussed below.

The hash function and creation of a cryptographic hash at steps 46 and 48 are well known in the prior art. There are several commercial software products that can create a cryptographic hash and perform comparisons of documents for validation of matching cryptographic hashes to determine authenticity. The functionality available in any such software is incorporated into a system and method of the invention. Once the cryptographic hash is attached to the file, it is formally issued and ready to be distributed to recipients at step 30. Recipients may include municipal or state plan review personnel, building inspectors, plumbers, electricians, builders, fabricators, and other tradesmen involved in the construction of the project or fabrication of an element or structure to be used in the project. Files may be distributed by emailing to designated recipients or uploading the files to a database or file sharing site accessible by designated recipients. During any of the process steps, such as the creation step 20, revision step 26, or approval step 24, a creator or reviser or architect may be prompted to designate certain persons as the recipients of the particular file. For example, a drop down or check box may be provided with pre-loaded names of individuals or entities that are involved with the project and should have access to the particular file as determined in an optional set-up stage 8. For files that are uploaded to a database or file sharing site, the creator, reviser, or architect may be prompted to designate a particular folder or site to which the particular file is to be uploaded, including to one of multiple folders or sites associated with the project to segregate access to certain files by only certain recipients with access to that folder or site, if desired. A copy of that file or notice that the file is available from a database or file sharing site to which the recipient has been or will be given access is preferably automatically sent those recipients.

Upon receiving an email with the file or a notice that the file is available, the recipient may access the file for extraction at step 32. If a disclaimer or other agreement was included with the file during issuance at step 28 or otherwise, then the recipient will be provided with the terms of the disclaimer or agreement upon trying to open or save the email attachment or trying to access the database or file sharing site or selecting the file to be extracted from the database or file sharing site at step 34. The terms of the disclaimer or agreement may automatically be loaded for viewing by the recipient or a link to another electronic file or website may be provided to allow the recipient to review the terms. The recipient will then read the terms and be prompted to accept or decline the terms at step 35. If declined, then the recipient is denied access to the file, which cannot be opened, saved, or downloaded, at step 36. If accepted, or if there was no disclaimer or agreement included with the file, then the recipient extracts the issued project file(s) to a local drive at step 38. The file(s) are stored on the recipient's local drive until such time as the recipient is ready to use the file for the project at step 74. During extraction, the file is not opened by the recipient, only saved to a local drive. If the document were opened and saved locally, the cryptographic hash would be altered by the embedded hash function, which would cause the file to unnecessarily fail the comparison at step 84, discussed below.

Figure 5:
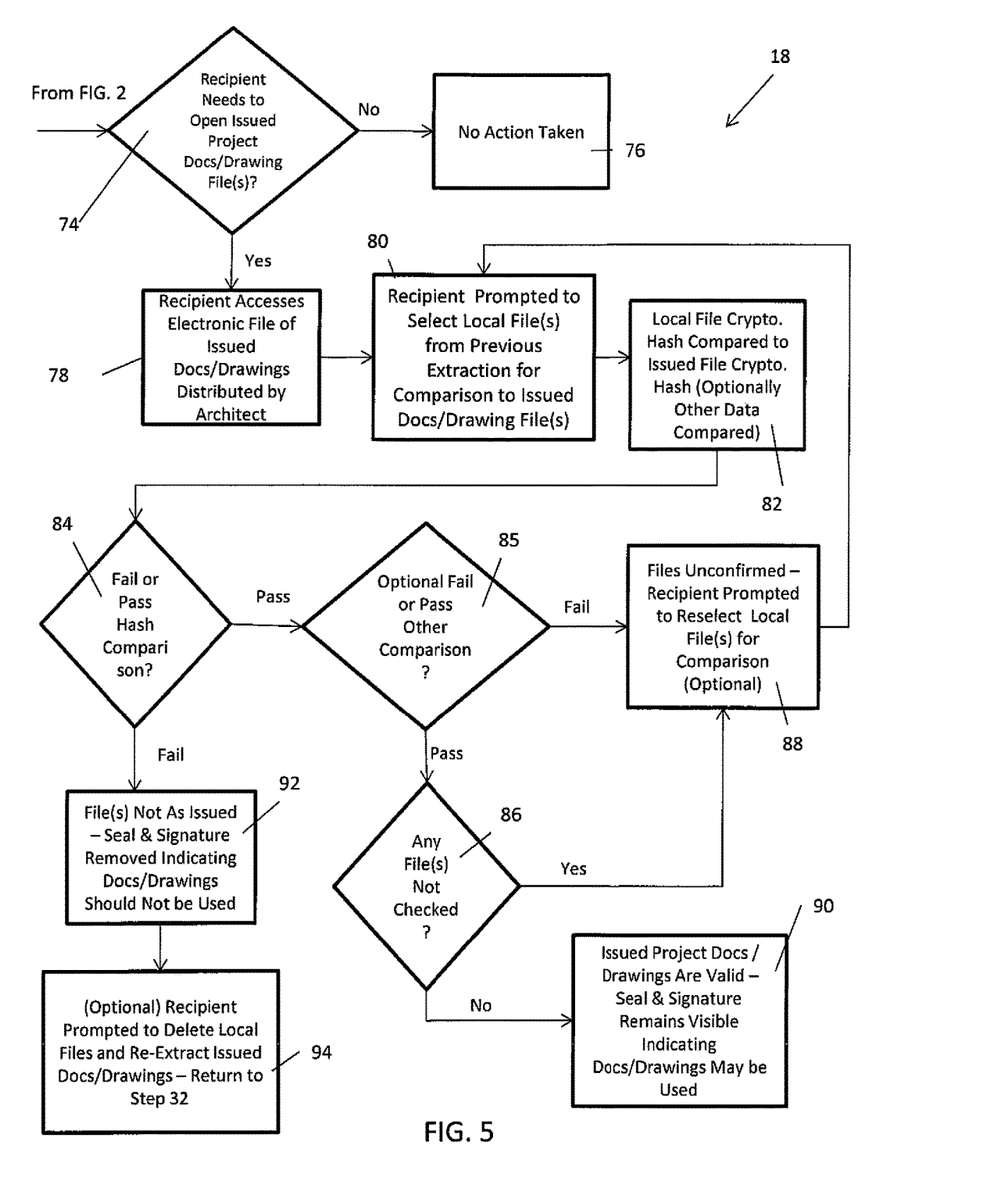
FIG. 5 is a flow chart showing preferred process steps for another stage of the embodiment according to FIG. 1.

Preferably, the recipient is prompted upon accessing the file to select whether the recipient is extracting the file (step 38) or opening the file for use (step 78). If extracting, the file is preferably automatically saved on a local drive or file folder selected by the recipient without opening the file. Most preferably, the extraction file is locked from being opened by the recipient, so that it can only be saved locally for later comparison. This prevents the recipient from subsequently opening the extracted file and making any changes to the file (whether intentional or inadvertent), which would impact the later comparison step 80. If opening, the validation steps of processing stage 18 discussed below are followed. Also, if opening, the document would not be locked, but remain in an openable state so the recipient can view the document electronically or make print-outs of the document, as desired, for use in the permitting or construction or fabrication process if it passes the validation process. Additionally, if extracting, the disclaimer/agreement inclusion and acceptance steps 33-36 may be bypassed by a system according to the invention, allowing the recipient to extract the issued file(s) without reviewing and agreeing to the terms of any disclaimer or agreement accompanying the file(s). If opening the file for use, steps 33 and 36 may be inserted between steps 78 and 80. As another alternative, steps 33-36 may be used anytime the recipient accesses the originally distributed file at the extraction stage (between steps 32 and 38) and again at the use stage (between steps 78 and 80), as an extra measure to ensure the recipient has agreed to the terms in order to access the issued file(s).

Figure 4:
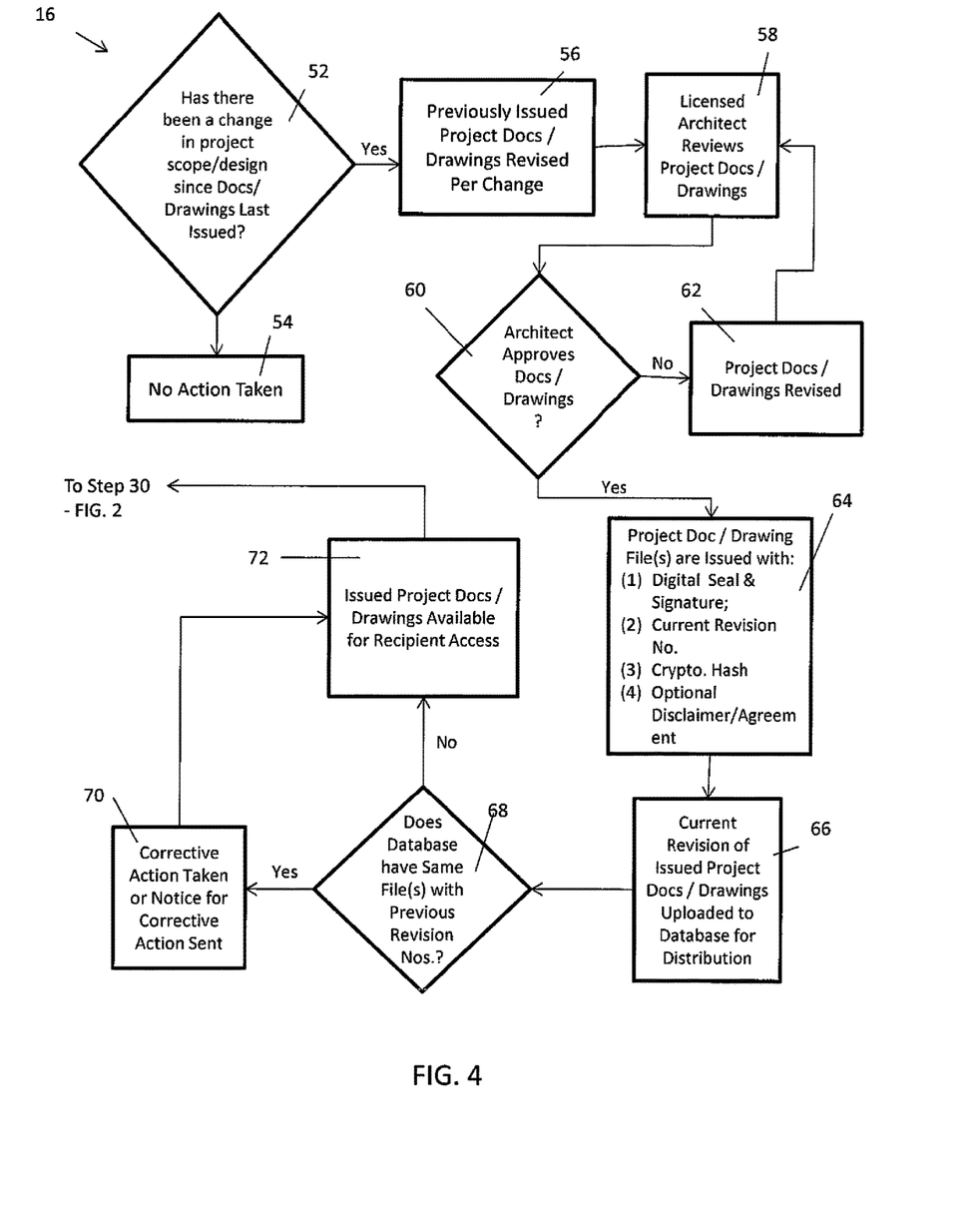
FIG. 4 is a flow chart showing preferred process steps for another stage of the embodiment according to FIG. 1.

A preferred embodiment of a project change processing stage 16 is shown in more detail in FIG. 4. Frequently during the course of a project, there will be a change in the scope of the project or the design parameters, whether for aesthetic, functional, or budgetary purposes, that will require revision of previously issued documents. If no project change has occurred at step 52, then no action is taken at step 54 and the last issued version or revision of a document remains available for access by a recipient. If a project change occurs at step 52, then the previously issued document is revised per the project change at step 56. Step 56 is similar to the creation step 20 discussed above. Once a final version of each revised document for a project change is created, the file(s) are reviewed by a licensed architect at step 58. Most preferably, the reviser is prompted as part of step 56 to indicate if the document being saved is a final version ready for review by the licensed architect. If the reviser indicates yes, then the file will be electronically sent to the licensed architect for review at step 58 in the same manner as review step 22 (including omitting the review step if the reviser is the architect). Approval step 60 is the same process as approval step 24. Revision step 62 is the same process as revision step 26. Document issuance step 64 is the same process as issuance step 20, except that a current revision number is included in the issued document, rather than being optional. Once issued, the documents are stored in a database or uploaded to an online file sharing site for distribution to recipients at step 66. The file information, such as the file name, revision number, and/or project number, is compared with previously uploaded documents in the database or file sharing site at step 68 to determine if the file being uploaded is a revision of another file already in the database or on the file sharing site.

If the new file is a revision of a previously loaded file, based on that comparison, then some corrective action is preferably taken so that only the newly issued version is accessible by recipients or there is a differentiation between the versions of issued files. Optionally, but preferably, the prior version is automatically deleted from the database or file sharing site at step 70. Alternatively, the architect may be prompted to select whether or not to delete the prior version at step 70. If the architect selects yes, then the prior file is deleted. The architect and any other designated users preferably receive a notification that there was a prior version that has been deleted (or not) and that the new file was successfully uploaded. Alternatively, step 70 may include sending a notice (such as an email) to the architect or other designated user that there is a prior version, which can then be manually deleted if desired. If deleted, then the older file is no longer available for the recipient to access and only the new file is available. Most preferably, all versions of the issued files are maintained for archival purposes on another server, in another database not accessible by recipients, or on a separate storage device.

As alternative to deleting the file, corrective action may include automatically removing or disabling the digital seal and signature from the prior version stored in the database or file sharing site or sending a notice to the architect or other designated person to manually remove the digital seal and signature from the prior version file. As yet another alternative, the file name for the previously issued file(s) may be automatically changed or a notice sent to the architect or other designated user to manually change the file name for the previously issued file(s) to include an indicator that it is not current, such as "OLD." The file name may be automatically changed and the digital seal and signature removed or disabled as another alternative. If the older version is subsequently accessed (instead of the newer version being accessed), it will be apparent to the recipient that the selected file is no longer an authentic, valid file as approved and issued by the architect, which will prompt the recipient to look for the newer file. Once corrective action is taken, or it is determined that there is no prior version of the issued file in the database or on the file sharing site, the newly issued revisions per the project change are available for access by the recipient through the database or file sharing site at step 72 using the same distribution or notice and access steps previously described for database or file sharing site distribution in step 30 and access step 32.

When project change stage 16 is used, it is not desirable to distribute the issued files (whether original issue or revision issue) to recipients using email because a comparison function is needed and the recipient will still have access to the older version of the file through the email unless the recipient takes active steps to delete the email and file. However, it is still possible to distribute original and revised issued files to recipients via email when processing stage 16 is used. In that case, a system according to the invention will automatically send out a notification (preferably email) at step 72 to any recipient designated to have access to the particular file or any recipient that has previously extracted the prior version of the file that a newer revision of the file has been issued and is attached to the email. A similar notice that a newer version is available is also preferably sent to recipients via email or other notification when access is through a database or file sharing site. For email distribution, the notice will preferably request that the recipient delete the previously issue file from its local drive if it was previously extracted, delete any email containing the previously issued file as an attachment, and/or destroy or mark as obsolete any print outs of the previously issued file. If the recipient is required to obtain the newly issued revision from the database or file sharing site, preferably, the previously issued file has been delete or the digital seal and signature deleted as described above.

It is noted that processing stage 16 is an optional part of a method and system according to the invention. Even if a project change requiring drawing or other document revisions occurs, it is not necessary to compare files to determine if there is a prior revision to be deleted or from which the digital seal is to be removed. Revised documents for project changes may be issued and distributed as described in process steps 28 and 14. This may result in a recipient having access to multiple versions of the same document, which is a common occurrence in the traditional paper or electronic distribution methods previously used. The methods previously used to differentiate between drawings and other documents to ensure the most current revision is being used may still be used with a method and system of the invention (e.g. visually comparing revision numbers on documents). However, it is most preferred to use processing stage 16 to avoid inadvertently relying on an old document version during construction.

A preferred embodiment of a validation processing stage 18 is shown in more detail in FIG. 5. After the recipient has extracted the issued document file(s) at step 38, the recipient will need to open and use the issued document(s) at some point during the permitting process or during the building, construction, or fabrication process for the project. That may be immediately after extracting the issued file(s) or at a later time, such as days, weeks, or even longer after extracting the issued file(s). At step 74, the recipient determines whether he or she needs to open an issued file(s), if not then no action is taken at step 76, if yes, then the recipient accesses the electronic issued file(s) at step 78. The recipient will access the issued file(s) from the original source (e.g. from the architect or architecture firm), which may be a file attached to an email or a database or file sharing site accessed by the recipient to retrieve the file(s). This is essentially the same process the recipient used to extract the files at step 38, except the recipient will attempt to open the files at step 78. Upon accessing the original file source, the recipient may be prompted to determine whether the recipient is accessing for extraction or use, or such may be determined automatically by the recipient's actions in either attempting to open the file or only saving the file to a local drive. The steps requiring agreement to the terms of any disclaimer or other agreement (steps 33-36) may also be inserted between steps 78 and 80. At step 80, the recipient is prompted to select the previously extracted local file(s) for comparison. The cryptographic hash of the selected local file(s) is then compared to the cryptographic hash of the issued file(s) from the original source at step 82. Each set of local and original source files may be compared one pair at a time or multiple file sets may be compared. If multiple file sets are compared, the selection of local files at step 80 is configured (such as in a table linking the local file with the corresponding original source file) so the recipient can pair the files the recipient believes to be the same to match the local file to the original source file so the correct file sets are compared at step 82. If any of the files being opened fail the comparison at step 84, the digital seal and signature from the file being opened will automatically be removed. The absence of the digital seal and signature in the opened file will indicate to the recipient that the document is not authenticate and should not be used. A pop-up or other type of notice to the recipient (in addition to removal of the digital seal and signature) indicating that the files failed the comparison and the file being opened should not be used may also be provided as part of step 92 (or step 94), as an additional way to ensure the unauthenticated document is not used for permit review or any aspect of the construction process. Optionally, but preferably, the recipient is also notified at step 94 to delete the local files previously extracted and return to step 32 to re-extract the documents and start the validation process again.

In addition to the cryptographic hash, other information is preferably compared at step 85 as an additional verification step and to avoid unnecessary hash comparison failures requiring the recipient to re-extract the document and start the validation process from the beginning. Most preferably, this comparison occurs prior to the hash comparison at step 84, but could also be inserted between steps 84 and 92. For example, the file names and/or revision number information may also be compared. If the file names fail comparison (which would indicate the recipient inadvertently selected the wrong local file for comparison), then the digital seal would not be removed, but the user would be prompted to reselect the local file for comparison at step 88. Alternatively, if comparison 85 is inserted between steps 84 and 92, the step 92 would occur if the comparison at step 85 passes (the file names, for example, match) or the recipient would be prompted to reselect the local files at step 88 if the comparison at step 85 fails (the file names do not match). Alternatively, other file data (such as project identification information, creation date, creator or reviser identification, etc.) may be used as the sole comparison, without comparing the cryptographic hash (which could be omitted from the process altogether, but that is not preferred).

If the files pass the hash comparison at step 84, then there is an optional check to see if any files were not compared at step 86. This may happen if the recipient fails to select a local file for comparison at step 80. If one or more files were not compared, then the files are unconfirmed and the recipient is prompted at step 88 to reselect the local files for comparison (returning to step 80). If all files being opened were successfully compared, then the file(s) are valid as issued by the architect and the digital seal and signature remain visible when the document is opened at step 90, indicating the document may be used by the recipient. If optional step 86 is not included, then upon passing the comparison at step 84 (or 85, if inserted between steps 84 and 92) the digital seal and signature will remain visible at step 90.

As an alternative, the recipient may be able to open and use the locally saved file(s) by comparison to the original source files or another set of duplicate files maintained and controlled by the architect or other user in a database or file sharing site. In that case, when the recipient goes to open the local file(s), the recipient will be prompted at step 80 or step 88 to select the original source file(s) (or duplicate source files) for comparison at steps 84, 85, and 86. The duplicate files used for comparison may be locked, so they cannot be opened by the recipient, but only selected for comparison to the local file.

Figure 6:
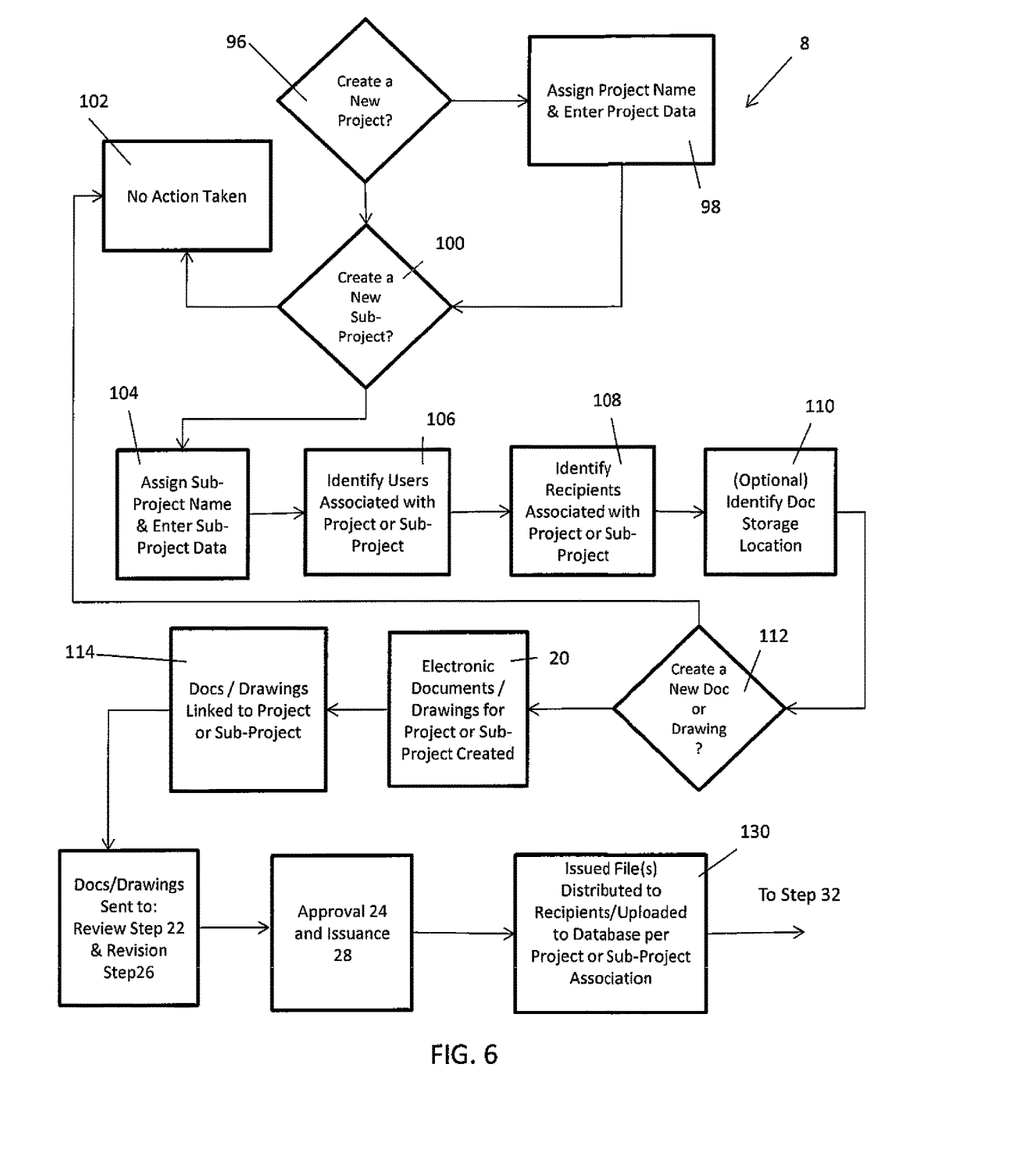
FIG. 6 is a flow chart showing preferred process steps for another optional stage of the embodiment according to FIG. 1.

A preferred embodiment of an optional project set-up and distribution processing stage 8 is shown in more detail in FIG. 6. This optional project management component facilitates ease of document flow between creation, revision, approval, and distribution. At the start of a new project, preferably prior to creation of any documents to be issued, a user is prompted at step 96 to select whether a new project is being created or there is a tab or file that allows a user to create a new project. If a new project is being created, the user assigns the project a name and inputs project related identification data at step 98. The user may be prompted for entry of this information or certain categories of this information or there may be options or tabs that can be selected by the user. If a project already exists, a user is prompted at step 100 to select whether a new sub-project is being created or there may be a tab or file that allows a user to create a new sub-project. A sub-project may be any portion of the overall project for which it may be desirable to segregate documents and users and recipients associated with those documents. For example, documents, users and recipients associate with fabrication of specialized beams required for the roof of a structure as part of a "Roof Beam" sub-project may be segregated from documents, users, and recipients associated with construction of the building foundation, which may also be its own sub-project. If a new sub-project is being created, the user assigns the sub-project a name and inputs project related identification data at step 104. Again a user may be prompted for entry of this information or certain categories of this information or the selection and input/entry of the information may be options or tabs that can be selected by the user. Project or sub-project identification data may include an address for construction, description of the project or portion of the project, design criteria, client name and contact information, name of the user responsible for overseeing the project or sub-project, etc.

At step 106, users associated with the project or sub-project are identified. These may be the architect(s), draftspersons, designers, etc. working on the architectural design process. At step 108, recipients associated with the project or sub-project are identified. These may be a client, permit or plan review personnel, builders, contractors, fabricators, interior designers (working outside of the "user" category), etc. Most preferably, email and contact information is included for all users and recipients to facilitate transmission of documents and notices or other information related to project documents. At step 110, a database (or sub-database) or file-folder location is optionally designated for storage of documents associated with the project or sub-project. This step is particularly useful when the issued documents are distributed to recipients through a database or a file sharing site, rather than through email, or where a comparison version of an issued document is stored on a database or file sharing site. Having segregated storage locations for various sub-projects aids in project management, making it easier to find files associated with a particular sub-project, and aids in allowing recipient access to only those files for which the recipient needs access.

At step 112, a user is prompted to create a new document or will have a tab or file to allow a user to create a new document for the project or sub-project. If a new document is to be created, it is created, reviewed, revised as needed, approved, and issued as previously described with respect to steps 20, 22, 24, 26, and 28, except that the file created is linked to the project or sub-project at step 114. The creator may link the document with a project or sub-project by creating the document within that project or sub-project in a system according to the invention or the user may be prompted to select or assign a previously created project or sub-project when saving the document. The linked document will have data embedded or associated with the file to relate the file to the particular project or sub-project for which it was created, according to the previous project set-up steps, such as identification of users, recipients, and storage location. Once a document created is ready for review at step 22, the document or a notice may be automatically forwarded to the architect(s) previously associated with the assigned or designated project or sub-project. Alternatively, the creator may be given the option to select from one or more architects previously associated with the project or sub-project to which the file or a notice for review will be sent. An unapproved file needing revision at step 26 and re-review at step 22 will similarly be sent to a designated or associated reviser. Similarly, once a file is issued, it is distributed at step 130 only to the recipients or only saved to the database/folder associated with that project or sub-project. Distribution under step 130 is otherwise the same as distribution step 30. These steps may be performed automatically in accordance with the initial project set-up or the user may be prompted to specifically select one or more of the previously designated or associated users, recipients, or storage locations. Project set-up parameters, such as associated users or recipients or design criteria, may be modified by authorized users at any stage of a project or sub-project. If a changed parameter is the addition of a new recipient or a different storage location, a system according to the invention may automatically distribute previously issued files (preferably only current versions) to the new recipients designated to receive them or move previously issued files to the new storage location. Alternatively, a user may be prompted whether not such action should be taken.

Most preferably, each user is assigned or creates a login identification for accessing a system according to another preferred embodiment of the invention. Each time a user access the system, he or she is prompted to enter this login identification (or create one, if one does not already exist). The system and method are preferably capable of tracking and recording information regarding all actions taken by a user, such as creation of a new document, revisions to a document, sending notices to other users or recipients, etc. This information preferably includes identification of the user (through his or her login identification), time of access, type of action taken, name of the particular file(s) accessed, and optionally the purpose of the access (e.g. creation of new document or revision). This information may also be provided to a user according to pre-set report delivery times or upon on-demand access to a report. Preferably, the reported information may be selectively formatted to include information regarding access to only particular file(s), date ranges, or particular users, as desired by a user.

Figure 7:
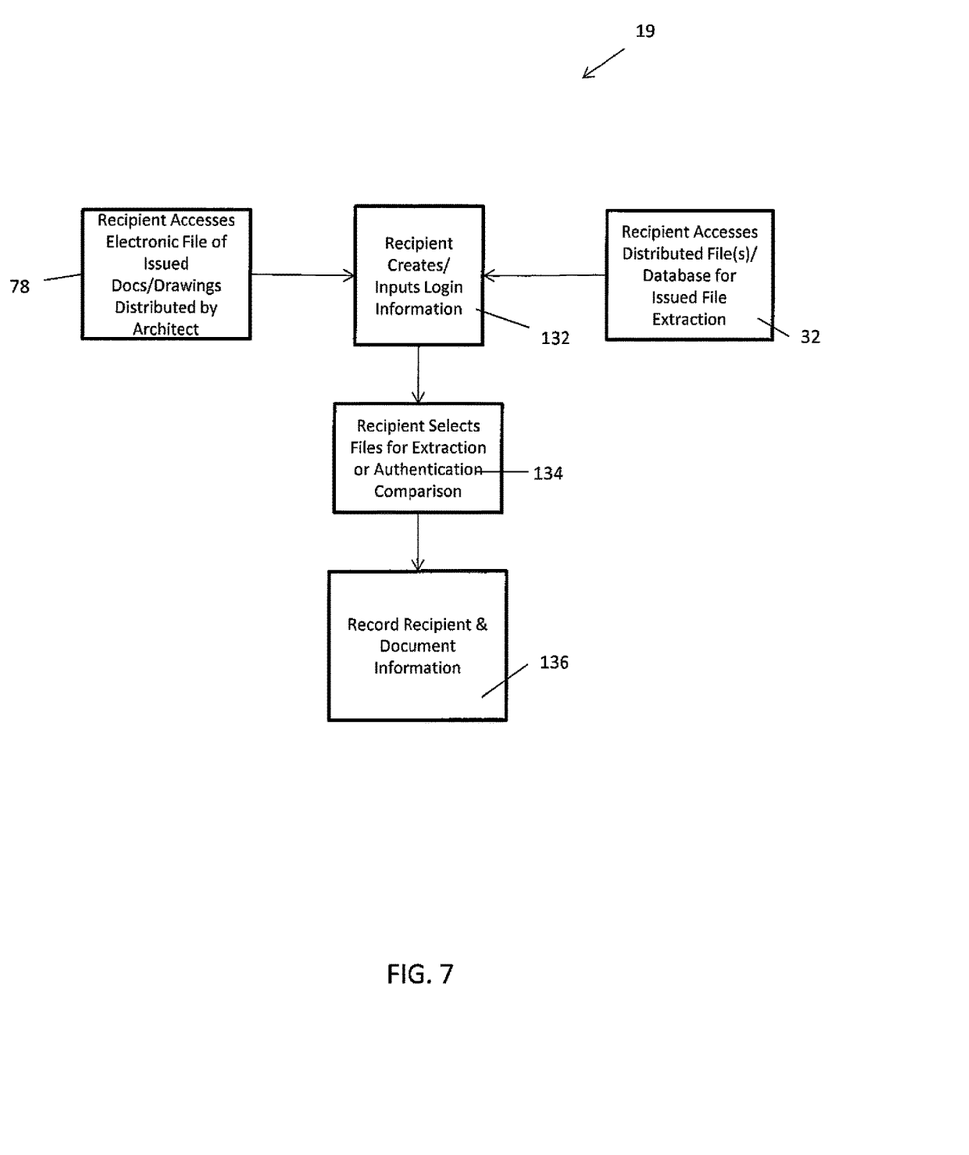
FIG. 7 is a flow chart showing preferred process steps for another optional stage of the embodiment according to FIG. 1.

A preferred embodiment of an optional access tracking processing stage 19 is shown in more detail in FIG. 7. This optional access tracking component records information each time a recipient accesses a document. Preferably, the first time a notice is sent to any particular recipient that a document has been distributed via an online database or file-sharing site at step 30, the notice includes a link to the database or site. When a recipient accesses the database or file sharing site, he or she is prompted to either create a login identification (login name and password, preferably), if the recipient does not already have one, or to enter the previously created login information at step 132. Most preferably, the notice of distribution also includes a code to be entered by the recipient to designate the recipient as someone authorized to have access to the database or site prior to allowing creation of a login identification. Each time a recipient accesses a document for extraction at step 32 or for validation and use at step 78, the recipient is prompted for his or her unique login identification at step 132. The recipient is then prompted at step 134 to select the files for extraction or authentication, and is optionally prompted to designate whether the file(s) are being accessed for purposes of extraction or authentication. Information is recorded at step 136 each time a recipient accesses the database or file sharing site. This information preferably includes identification of the recipient (through his or her login identification), time of access, name of the particular file(s) accessed, and optionally whether the purpose of the access was for extraction or authentication. This information may also be provided to a user according to pre-set report delivery times or upon on-demand access to a report. Preferably, the reported information may be selectively formatted to include information regarding access to only particular file(s), date ranges, or particular recipients, as desired by a user. As an additional option, access tracking processing stage 19 may also be linked with tracking user access to the database or file sharing site in a manner similar to tracking recipients, through a user login identification. This may be particularly useful for tracking when document revisions are uploaded and what corrective action is taken at steps 66-70, but may also be used to track access to original document file uploads.

According to a preferred embodiment, a system for carrying out the preferred method of validating and authenticating architectural documents issued by a licensed architect according to the invention comprises:
  a computerized server connected to a network to allow communication with and between one or more user computers, terminals, or other computing devices; one or more recipients, including by email; and optionally one or more external sites (an external database, file sharing site, or a remote recipient computer or terminal) via the internet;
  one or more recipient computers or terminals or other computing devices, with or without a server, to send and receive email to provide an interface allowing the recipient to extract, save, and open (or attempt to open) issued files; and/or optionally to allow communication via the internet with one or more external sites (an external database, file sharing site, or a remote user computer or terminal);

a software component at the user's computer, terminal, computing device, or server for managing, initiating, and carrying out the method steps of the project set-up stage (optional), document creation, review and revision stage (optional), issuance upon approval by a licensed architect stage, distribution to recipients stage, validation stage, and access tracking stage (optional);

an optional database system for storing files for access by authorized users during the creation, review, revision, and project change stages and/or project set-up information, the database system connected to the user's computer, terminal, computing device, or server;

an optional database system (which may be part of a file sharing website) for storing issued files for access by authorized users and recipients, the database system accessible by the user's computer, terminal, computing device, or server and, optionally accessible a recipient's computer, terminal, computing device, or server;

a software component at the recipient's computer, terminal, computing device, or server, or embedded in or attached to an issued file extracted by the recipient, for managing, initiating, and carrying out the method steps of the extraction, opening, and validation stages.

According to another preferred embodiment, a system for carrying out the preferred method of validating and authenticating architectural documents issued by a licensed architect according to the invention comprises:

a user's computer, terminal, or other computing device connected to a communication network;

a first software component on the user's computer, terminal or other computing device for associating a digital seal and signature of a licensed architect with an electronic document approved by the architect the architect to create an issued document and, optionally, performs a hash function to create an issued document with the digital seal and signature and a cryptographic hash;

a recipient's computer, terminal, or other computing device connected to the communication network and configured to extract the issued document for validation and access the issued document for subsequent use in permitting, building inspection, construction, or fabrication if the accessed document passes validation; and a second software component on the recipient's computer, terminal, or other computing device or embedded in the accessed document for validating the accessed document by comparing data associated with the file of the accessed document to the data associated with the file of the extracted document and removing the digital seal and signature from the accessed document if the comparison fails, wherein the data compared in validating the documents is the cryptographic hash of the accessed document and the cryptographic hash of the extracted document and/or two or more of file name, creation date, last revision date, revision number, creator name, and reviser name.

According to another preferred embodiment, a system for carrying out the preferred method of validating and authenticating architectural documents issued by a licensed architect according to the invention comprises the components above and further comprises one or more of:

a database system for storing issued documents for access by authorized users and authorized recipients through their respective computers, terminals, or computing devices;

another software component on the user's computer, terminal or other computing device or embedded in the database for comparing one issued document being saved to the database to one or more other issued documents previously saved to determine if one of the previously save documents is a prior version of the document being saved and the document being saved is a new revision; and taking or initiating corrective action if a prior version was previously saved, which may include automatically deleting the prior version from the database, automatically removing or hiding the digital seal and signature from the prior version, automatically changing the file name of the prior version to differentiate it from the new revision, or sending notification to a user that a prior version exists in the database;

a computerized server connected to a network to allow communication between a computer, terminal, or other computing device of a first user and a computer, terminal, or other computing device of one or more other users;

another software component on the server for managing one or more of the following: creation of documents to be issued, review of documents to be issued, and revision of documents to be issued by communicating with a designated user that action needs to be taken with respect to the documents; and One or more components or steps described with one preferred embodiment of a system or method according to the invention may be used with another embodiment of the system or method, even if not specifically described in connection with the embodiment. References to servers, computers, terminals, and other computing devices are intended to include all such devices that permit the creation, communication, storage, and access to electronic document files, and/or that are capable of carrying out steps defined in a software program. Steps described herein as a prompt to a user or recipient may alternatively be a tab or other option to be selected by the user or recipient. Any combination of optional stages or steps may be used in connection with the preferred methods and system of the invention. Any step that is described as being carried out automatically may also be carried out manually after notification to a user or recipient. Additionally, any step that is described as being carried out manually after notification to a user or recipient may also be carried out automatically by a system according to the invention. Those of ordinary skill in the art will also appreciate upon reading this specification, that modifications and alterations to the methodology and system for validation and authentication of issued architectural documents may be made within the scope of the invention and it is intended that the scope of the invention disclosed herein be limited only by the broadest interpretation of the appended claims to which the inventors are legally entitled.

What is claimed is:

1. A method for validating electronically issued architectural documents comprising:

associating a digital seal and signature of a licensed architect with an electronic document approved by the architect;

performing a hash function on the document to create an issued document with the digital seal and signature and a cryptographic hash;

distributing the issued document to a recipient;

extracting the distributed document to a local drive on a computer, terminal or other computing device of the recipient to be used as a comparison document in a validating step;

accessing the distributed document when the recipient is ready to use the document;

validating the accessed document is the same as the issued document prior to using the accessed document by comparing the cryptographic hash of the accessed document with a cryptographic hash of the comparison document;

removing or hiding the digital seal and signature from the accessed document if the comparison fails;

saving the issued document to a database or a file sharing site accessible by a recipient;

comparing the document being save to one or more other issued documents previously saved to determine if one of the previously saved documents is a prior version of the document being saved and the document being saved is a new revision; and automatically removing or hiding the digital seal and signature from the prior version if the document being saved is a new revision.

2. The method of claim 1 wherein the distributing step comprises emailing the issued document to a recipient, saving the issued document to a database accessible by the recipient, or uploading the issued document to a file sharing site accessible by the recipient.

3. The method of claim 1 wherein the issued document is distributed to the recipient by notifying the recipient that an issued document has been saved to the database or file sharing site.

4. The method of claim 1 wherein the extracted document is the prior version and the accessed document is the new revision so the comparison fails, the method further comprising repeating the extracting step to extract the new revision.

5. The method of claim 1 further comprising:
identifying one or more users associated with a project, wherein at least one user is the licensed architect for the project;
identifying one or more recipients associated with the project;
linking the issued document with the project;
distributing the issued document to the one or more previously identified recipients using a computer, terminal or other computing device of the recipient(s).

6. The method of claim 5 further comprising:
creating a document for the project;
automatically distributing the document to one or more previously identified users for review or revision;
automatically distributing the document to the licensed architect for approval;
identifying a database, file sharing site or other storage location associated with the project for storing the document and the linked issued document; and
automatically storing the document and the linked issued document in the previously identified database, file sharing site or other storage location.

7. The method of claim 1 further comprising:
tracking a recipient's access to the database or file sharing site.

8. The method of claim 1 wherein the document requires a licensed architect's seal.

9. The method of claim 1 further comprising sending notification to a user that the prior version exists.

* * * * *